United States Patent
Lee

(10) Patent No.: US 12,292,335 B2
(45) Date of Patent: May 6, 2025

(54) WINDOW FOR FAR-INFRARED THERMAL IMAGING SENSOR ASSEMBLY AND A FAR-INFRARED THERMAL IMAGE SENSOR ASSEMBLY COMPRISING SAME

(71) Applicant: U Electronics Co., Ltd, Gyeonggi-do (KR)

(72) Inventor: Joon Sub Lee, Seoul (KR)

(73) Assignee: U Electronics Co., Ltd, Gyeonggi-do (KR)

( * ) Notice: Subject to any disclaimer, the term of this patent is extended or adjusted under 35 U.S.C. 154(b) by 0 days.

(21) Appl. No.: 17/913,802

(22) PCT Filed: Oct. 12, 2020

(86) PCT No.: PCT/KR2020/013855
§ 371 (c)(1),
(2) Date: Sep. 22, 2022

(87) PCT Pub. No.: WO2021/075807
PCT Pub. Date: Apr. 22, 2021

(65) Prior Publication Data
US 2024/0385046 A1    Nov. 21, 2024

(30) Foreign Application Priority Data
Oct. 16, 2019   (KR) .................. 10-2019-0128201

(51) Int. Cl.
*G01J 5/00*   (2022.01)
*G01J 5/0875*  (2022.01)
*G01J 5/48*   (2022.01)

(52) U.S. Cl.
CPC ............... *G01J 5/0875* (2013.01); *G01J 5/48* (2013.01); *G01J 2005/0077* (2013.01)

(58) Field of Classification Search
None
See application file for complete search history.

(56) References Cited

U.S. PATENT DOCUMENTS 6,218,667 B1 *  4/2001  Nonaka .................. G01J 5/08
                                                    250/353

FOREIGN PATENT DOCUMENTS

| JP | 2008-006652   | * | 1/2008 |
| JP | 2008-006652 A |   | 1/2008 |
| JP | 4158830       | * | 10/2008 |
| JP | 4158830 B2    |   | 10/2008 |
| JP | 2012-198191 A |   | 10/2012 |
| JP | 2012198191    | * | 10/2012 |

* cited by examiner

*Primary Examiner* — Hoon K Song
(74) *Attorney, Agent, or Firm* — The Webb Law Firm

(57) ABSTRACT

A window for far-infrared thermal imaging sensor assembly, according to the present invention, comprises: an incident surface on which far-infrared rays are incident; and an opposing surface facing a thermal imaging sensor, wherein the window for a far-infrared thermal imaging sensor assembly is bonded to an upper portion of the far-infrared thermal imaging sensor so as to transmit the far-infrared ray toward the far-infrared thermal imaging sensor, and the incidence surface is subjected to a refraction reduction treatment of the incident far-infrared rays compared to the refraction occurring on a flat surface of a same material.

11 Claims, 8 Drawing Sheets

[FIG. 1]
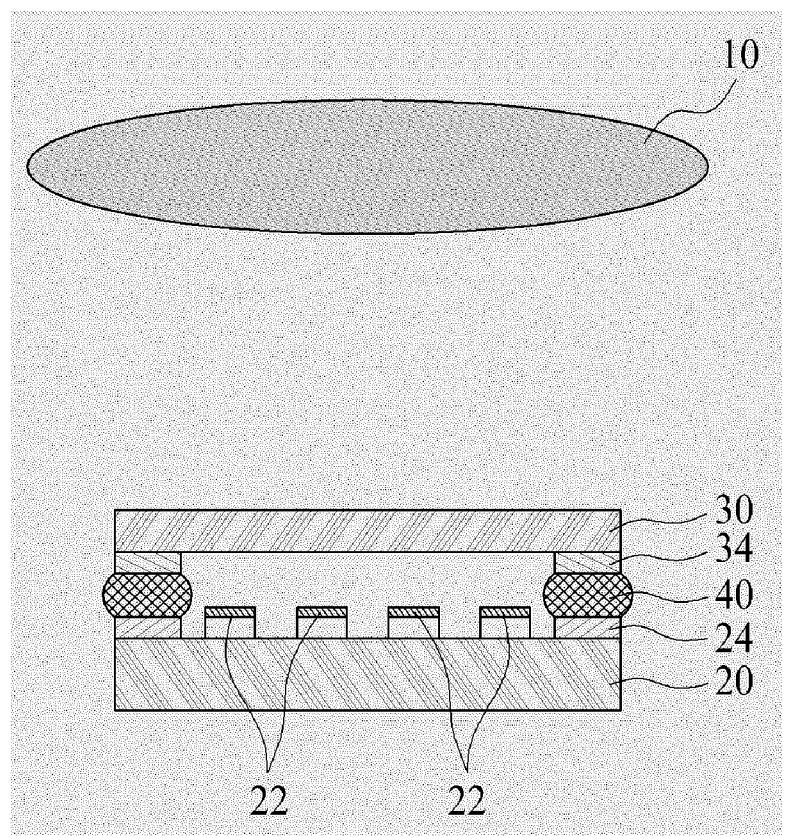

[FIG. 2]
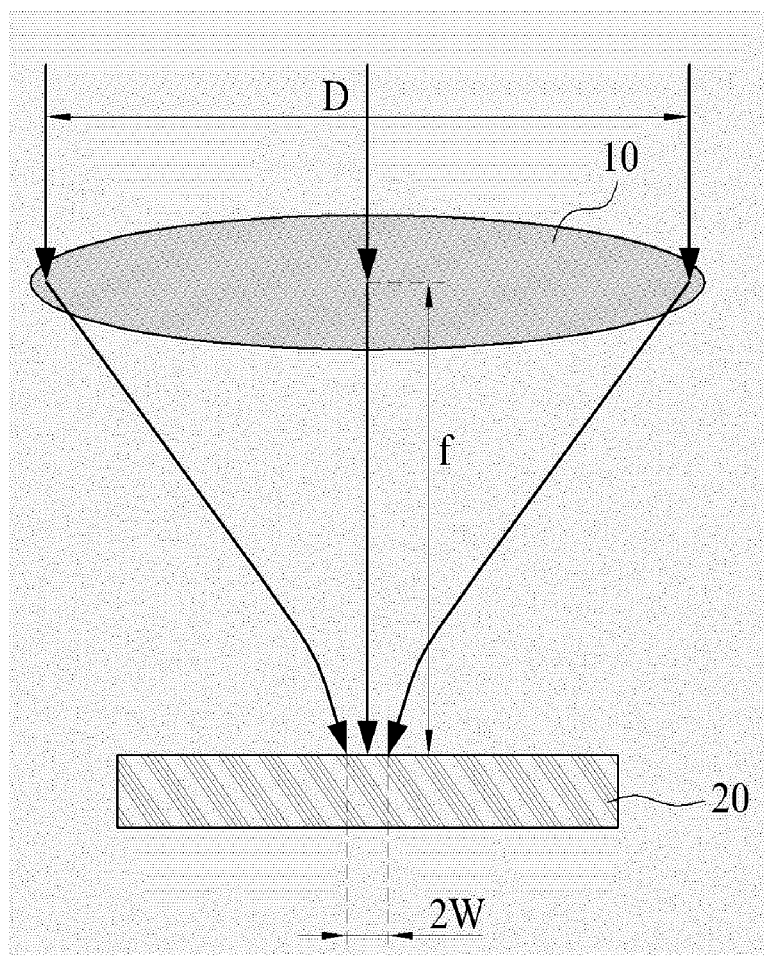

[FIG. 3]
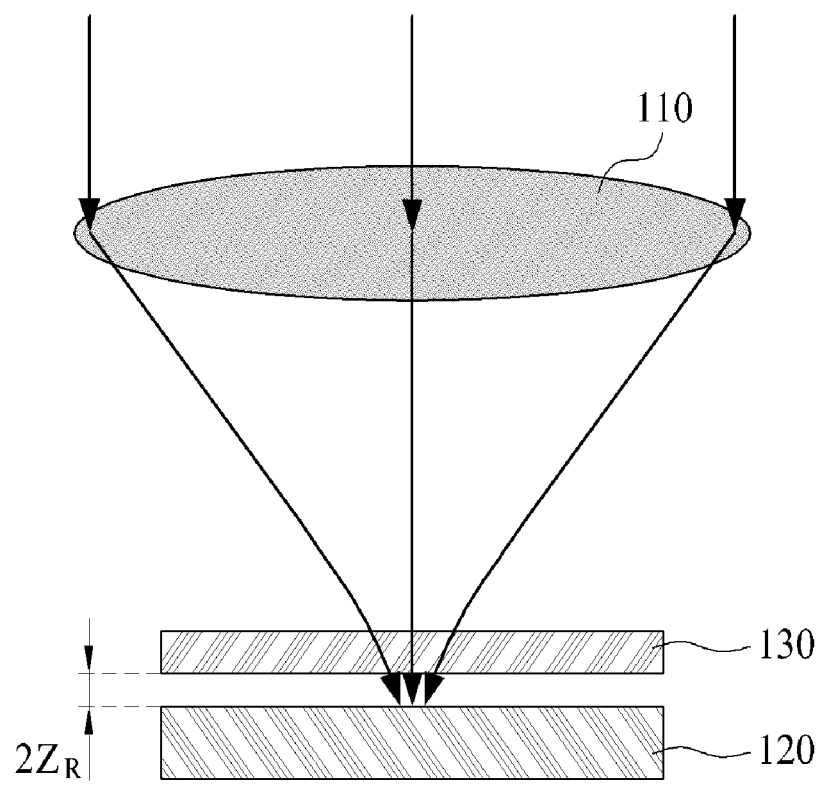

[FIG. 4]
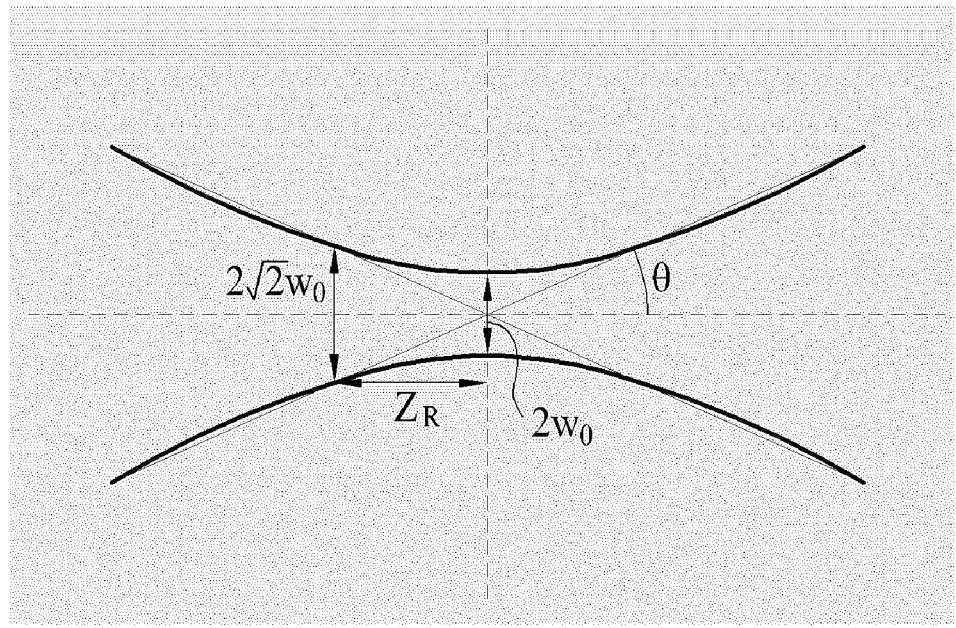
[FIG. 5]
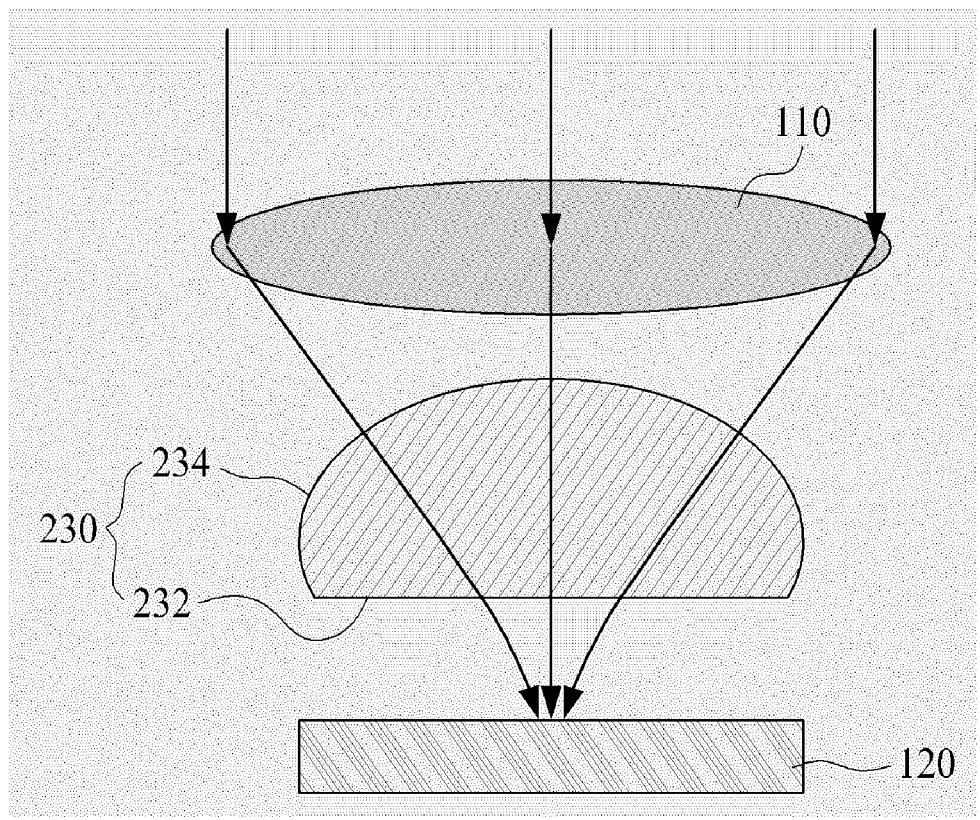

[FIG. 6]
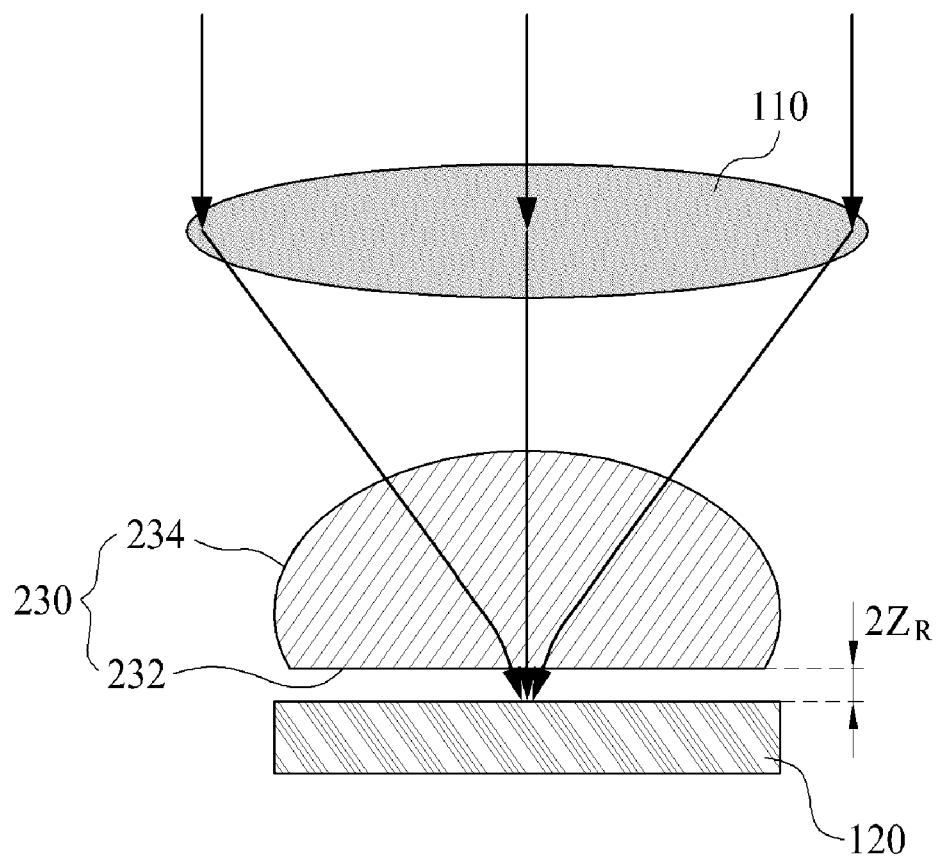

[FIG. 7]
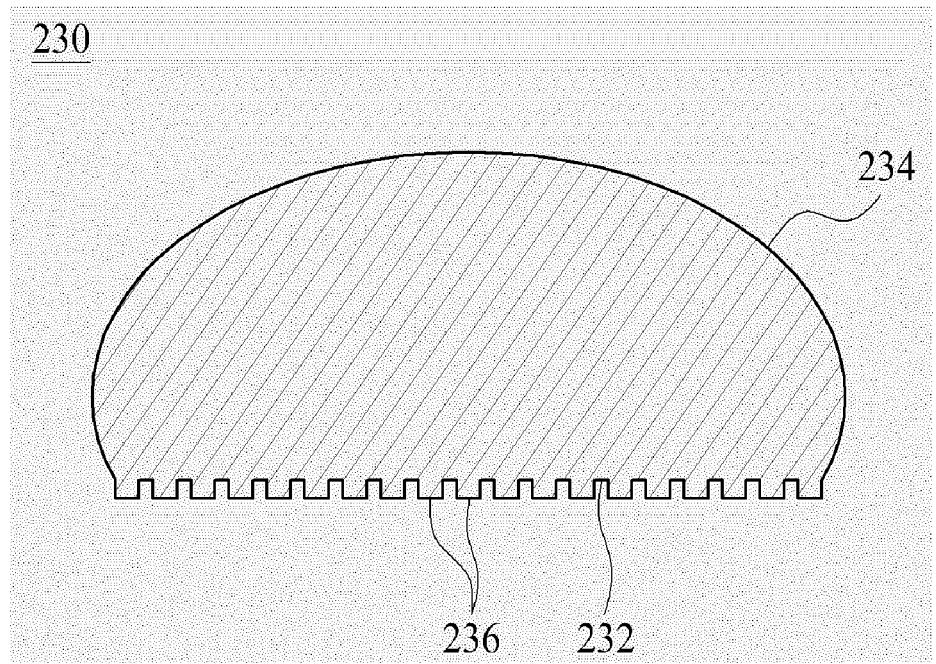
[FIG. 8]
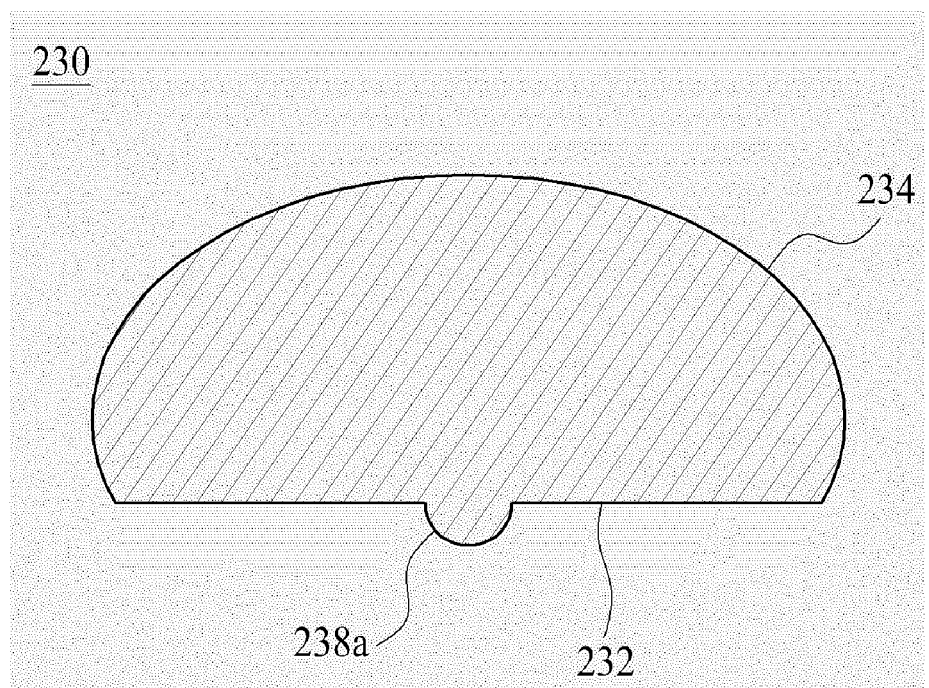

[FIG. 9]
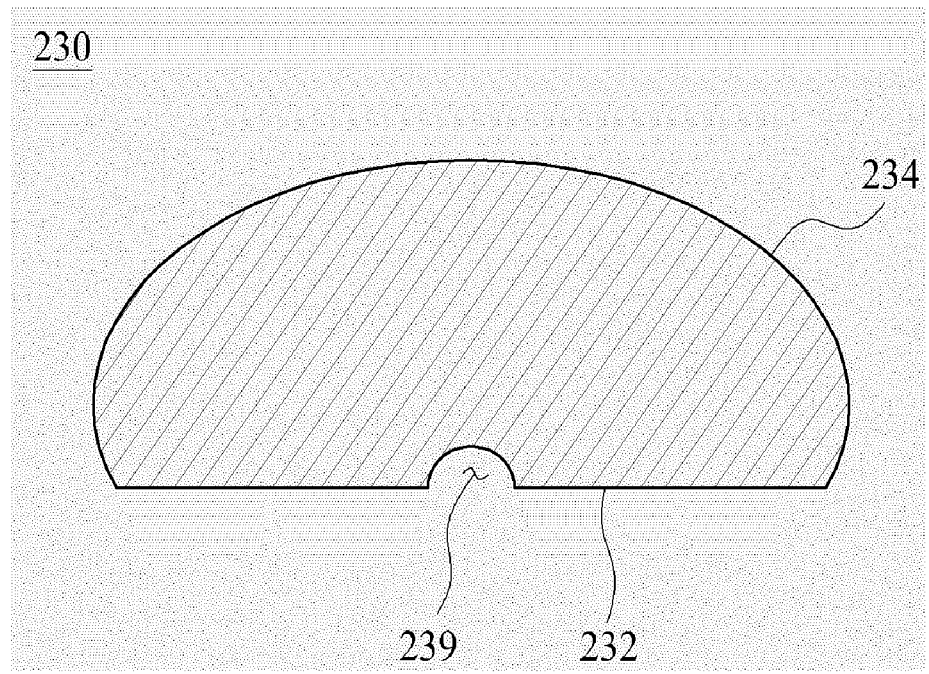
[FIG. 10]
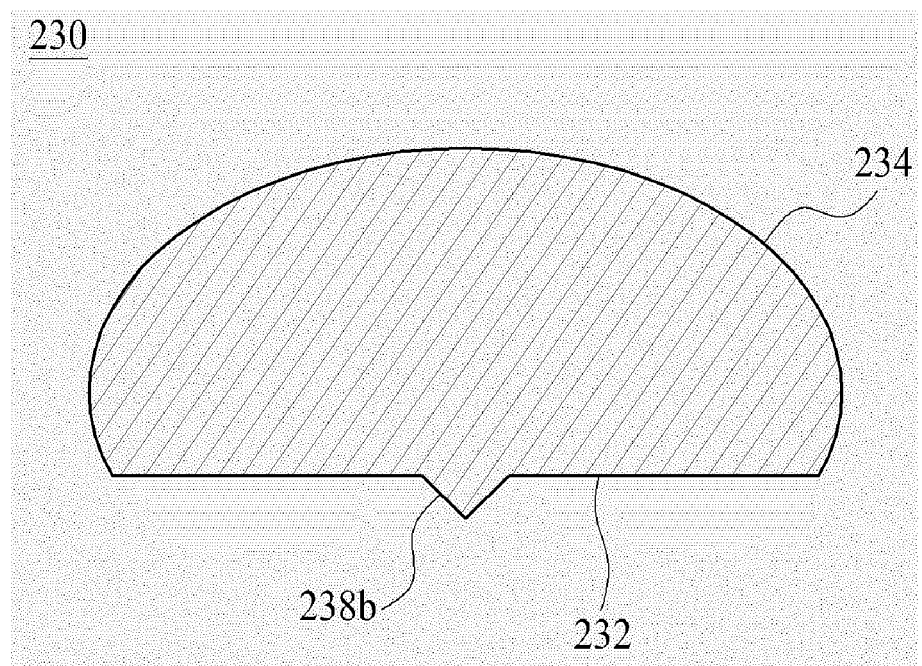

[FIG. 11]
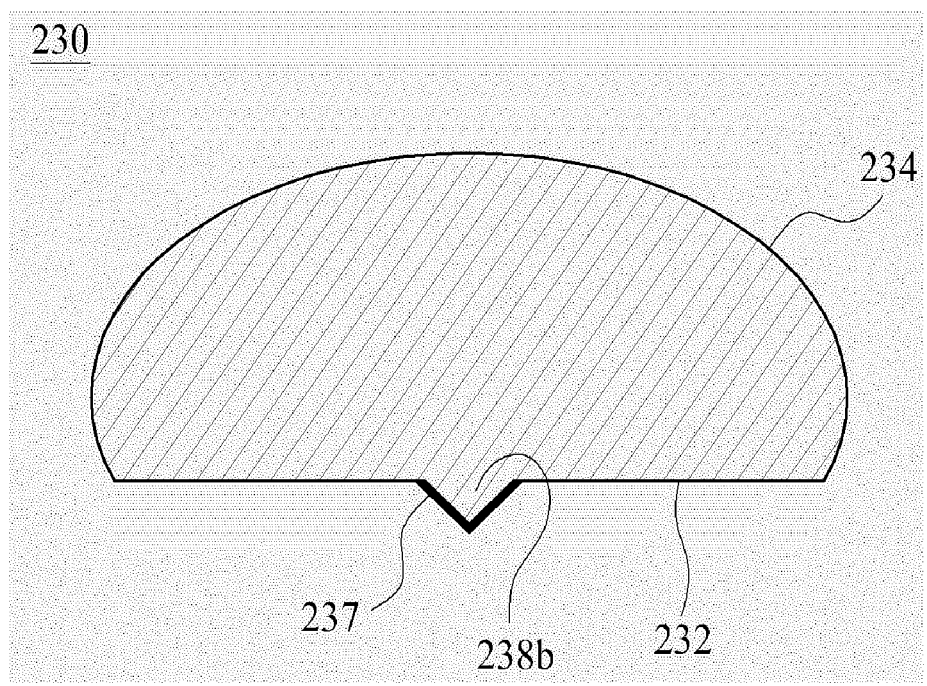

WINDOW FOR FAR-INFRARED THERMAL IMAGING SENSOR ASSEMBLY AND A FAR-INFRARED THERMAL IMAGE SENSOR ASSEMBLY COMPRISING SAME

1. FIELD

The present disclosure relates to a window for far-infrared thermal imaging sensor assembly and far-infrared thermal imaging sensor assembly including the same, and more particularly, to a window for far-infrared thermal imaging sensor assembly designed to minimize a size area of a single far-infrared sensing element, and far-infrared thermal imaging sensor assembly including the same.

2. BACKGROUND

A far-infrared thermal imaging sensor detects far-infrared rays of the wavelength of 8-12 um or 7-14 um emitted from an object itself, and provides the temperature and shape of the object in the form of images even without a separate light source.

For this purpose, the far-infrared thermal imaging sensor arranges the far-infrared sensing elements on a focal plane in two dimensions (FPA: Focal Plane Array), and calculates the far-infrared energy sensed by each far-infrared sensing element, and displays it in two dimensions, to obtain a thermal image.

FIG. 1 is a view illustrating an appearance of a conventional far-infrared thermal imaging sensor structure, and FIG. 2 is a view illustrating a process of focusing being made on the far-infrared thermal imaging sensor structure.

As illustrated in FIGS. 1 and 2, the conventional far-infrared thermal imaging structure has a plurality of far-infrared sensing elements 22 arranged in two dimensions on a substrate 20, and above the substrate 20, a window 30 is provided.

Here, a metal pad 34 for bonding is provided around the substrate 20 and the window 30, and has a bonded form due to a solder 40, and a space where the far-infrared sensing elements 22 are positioned can be maintained in a vacuum state by the window 30.

Here, although the design and processing technology of the far-infrared sensing element 22 must be improved in order to reduce the size of a single far-infrared sensing element 22, regardless of this, the minimum size is limited by the wavelength and lens of the far-infrared ray detected by the far-infrared sensing element 22.

This is due to the diffraction limit, and when focusing being made on the far-infrared sensing element 22 by the lens 10, due to the wavelength and the number of F of the lens (hereinafter referred to as F #), the size of the focus cannot become smaller than a certain size. And that size is determined by the following equation.

$$2w_0 = \frac{4\lambda f}{n\pi D} = \frac{4\lambda F\#}{n\pi}$$

($\lambda$: length of wavelength, f: lens focal length, D: lens diameter, n: medium refractive index at focus)

Therefore, when using a F #1 lens that is generally used, if the size of a single far-infrared sensing element 22 is smaller than 12.7 um in width and length with respect to the far-infrared ray of 10 um corresponding to the center of the wavelength band, the actual size of the focus becomes bigger, making it impossible to distinguish the shape, and thus the size of the single far-infrared sensing element 22 is inevitably limited to 12.7 um in width and height.

However, depending on the characteristics such as contrast and the like, a smaller size focus can be considered, which can be calculated by the following equation.

$$l_p/\text{mm} = \frac{1000 \text{ μm/mm}}{F\#\lambda}$$

(/mm: number of focus per mm, $\lambda$: wavelength in unit of μ)

As a result, this also shows a size constraint of 10 um in width and length.

Such a constraint of focus size becomes a condition restricting the minimum size of the sensor in the process of realizing a high resolution far-infrared thermal imaging sensor.

Therefore, a method for solving such problems is required.

SUMMARY

A purpose of the present disclosure is to resolve the aforementioned problems of prior art, that is, to minimize the size area of a single far-infrared sensing element provided in a far-infrared thermal imaging sensor assembly, thereby increasing image resolution.

Tasks of the present disclosure are not limited to the aforementioned tasks, and other tasks not mentioned above will be understood clearly by those skilled in the related art based on the disclosure below.

The incident surface is subjected to refraction reduction treatment so as to reduce a refraction of the incident far-infrared ray, in preparation for the refraction occurring on a flat surface of a same material.

The incident surface may be used for the purpose of creating thermal imaging, but to achieve the effects of the present disclosure, it must receive the refraction reduction treatment.

In addition, the incident surface may be formed convexly to have a preset curvature.

Further, the opposite surface may be formed to be flat.

In addition, a light extraction enhancement part may be formed on the opposite surface.

Further, the light extraction enhancement part may include a plurality of concavities and convexities formed on an entirety of the opposite surface.

In addition, the light extraction enhancement part may include a light extraction protrusion formed to protrude from the opposite surface.

Further, a surface of the light extraction protrusion may be formed in a curved shape to have a preset curvature.

Further, the light extraction protrusion may be formed such that its size area decreases as it gets farther away from the opposite surface, and form a vertex at the end.

Further, a metal thin film may be formed on at least a portion of a surface of the light extraction protrusion.

Further, the light extraction enhancement part may include a light extraction groove that is formed to be recessed on the opposite surface.

Further, the distance between the opposite surface and the thermal imaging sensor may be formed to be equal to or smaller than the Rayleigh range×2.

Further, the distance between the opposite surface and the thermal imaging sensor may be formed to be equal to or smaller than $$2Z_R = \frac{\lambda}{4\left\{\tan^{-1}\left(\frac{1}{2F\#}\right)\right\}^2 n^2}$$

($Z_R$: Rayleigh range, $\lambda$: length of wavelength, F #: number of F inside the window, n: medium refractive index at focus).

Further, a window for far-infrared thermal imaging sensor assembly, according to one form of the present disclosure for achieving the aforementioned purposes, may include an incident surface into which a far-infrared ray enters and an opposite surface facing towards the thermal imaging sensor, the window being bonded above the far-infrared thermal imaging sensor and formed to transmit the far-infrared ray towards the far-infrared thermal imaging sensor, wherein the distance between the opposite surface and the thermal imaging sensor is equal to or smaller than the Rayleigh range×2.

Further, to such a window for far-infrared thermal imaging sensor assembly, having another form of the present disclosure, the same characteristics of the window for far-infrared thermal imaging sensor assembly according to the one form described above, may be applied.

In addition, a far-infrared thermal imaging sensor assembly according to one form of the present disclosure, for achieving the aforementioned purposes, includes a far-infrared thermal imaging sensor including a far-infrared sensing element, and a window including an incident surface into which a far-infrared ray enters and an opposite surface facing towards the thermal imaging sensor, the window being bonded above the far-infrared thermal imaging sensor and formed to transmit the far-infrared ray towards the far-infrared thermal imaging sensor, wherein the incident surface of the window is subjected to refraction reduction treatment so as to reduce a refraction of the incident far-infrared ray, in preparation for the refraction occurring on a flat surface of a same material.

Further, to such a window which is a component of the far-infrared thermal imaging sensor assembly according to one form of the present disclosure, the same characteristics of the window for far-infrared thermal imaging sensor assembly described above, may be applied.

In addition, a far-infrared thermal imaging sensor assembly according to another form of the present disclosure, for achieving the aforementioned purposes of the present disclosure, includes a far-infrared thermal imaging sensor that includes a far-infrared sensing element, and a window including an incident surface into which a far-infrared ray enters and an opposite surface facing towards the thermal imaging sensor, the window being bonded above the far-infrared thermal imaging sensor and formed to transmit the far-infrared ray towards the far-infrared thermal imaging sensor, wherein the distance between the opposite surface and the thermal imaging sensor is equal to or smaller than the Rayleigh range×2.

Further, to such a window which is a component of the far-infrared thermal imaging sensor assembly according to another form of the present disclosure, the same characteristics of the window for far-infrared thermal imaging sensor assembly described above, may be applied.

A window for far-infrared thermal imaging sensor assembly for resolving the aforementioned problems and far-infrared thermal imaging sensor assembly including the same have the following effects.

First, by applying at least one of a method of reducing the distance between the far-infrared sensing element and the opposite surface of the window, and the incident surface of the window where a refraction of far-infrared rays does not occur, there is an advantage of minimizing the size of a focus being made on a single far-infrared sensing element.

Second, accordingly, there is an advantage of reducing the size of a single far-infrared sensing element and minimizing the size of an optical system including the same.

Third, according to embodiments of the present disclosure, it is possible to form various forms of light extraction enhancement parts on the opposite surface of the window to improve the far-infrared extraction efficiency, and further extend the distance between the opposite surface and the far-infrared sensing element.

The effects of the present disclosure are not limited to the aforementioned effects, and other effects not mentioned above will be clearly understood by those skilled in the art from the claims set.

BRIEF DESCRIPTION OF THE DRAWINGS

FIG. 1 is a view illustrating an appearance of a conventional far-infrared thermal imaging sensor structure;

FIG. 2 is a view illustrating a process of focusing being made on the far-infrared thermal imaging sensor structure;

FIG. 3 is a view illustrating an appearance of a far-infrared thermal imaging sensor assembly according to a first embodiment of the present disclosure;

FIG. 4 is a view illustrating the concept of the Rayleigh range caused by Gaussian optics;

FIG. 5 is a view illustrating an appearance of a far-infrared thermal imaging sensor assembly according to a second embodiment of the present disclosure;

FIG. 6 is a view illustrating an appearance of a far-infrared thermal imaging sensor assembly according to a third embodiment of the present disclosure;

FIG. 7 is a view illustrating an appearance of a window in a far-infrared thermal imaging sensor assembly according to a fourth embodiment of the present disclosure;

FIG. 8 is a view illustrating an appearance of a window in a far-infrared thermal imaging sensor assembly according to a fifth embodiment of the present disclosure;

FIG. 9 is a view illustrating an appearance of a window in a far-infrared thermal imaging sensor assembly according to a sixth embodiment of the present disclosure;

FIG. 10 is a view illustrating an appearance of a window in a far-infrared thermal imaging sensor assembly according to a seventh embodiment of the present disclosure; and FIG. 11 is a view illustrating an appearance of a window in a far-infrared thermal imaging sensor assembly according to an eight embodiment of the present disclosure.

DETAILED DESCRIPTION

Hereinafter, preferably embodiments of the present disclosure in which the purposes of the present disclosure can be specifically realized will be described with reference to the drawings attached. In describing the embodiments, for like components, like titles and reference numerals are used, and additional explanation thereof will be omitted.

FIG. 3 is a view illustrating an appearance of a far-infrared thermal imaging sensor assembly according to a first embodiment of the present disclosure.

As illustrated in FIG. 3, a far-infrared thermal imaging sensor assembly according to the first embodiment of the present disclosure includes a thermal imaging sensor 120 and a window 130.

The thermal imaging sensor 120 may include a substrate, and a plurality of far-infrared sensing elements that are arranged in two dimensions on the substrate, and in this drawing, the thermal imaging sensor 120 is illustrated in a simplified manner.

The window 130 includes an incident surface into which far-infrared rays passing through a lens 110 enter and an opposite surface facing towards the thermal imaging sensor 120, and the window 130 is bonded above the far-infrared thermal imaging sensor 120 and performs a role of transmitting the far-infrared rays towards the far-infrared thermal imaging sensor 120. By such a window 130, the space where the far-infrared sensing element 22 is placed can be maintained in a vacuum state.

Further, in this embodiment, the distance between the opposite surface of the window 130 and the far-infrared sensing element of the thermal imaging sensor 120 can be formed to be equal to or smaller than the Rayleigh range×2.

As described in the background part, when focusing being made on the far-infrared sensing element through the lens 10, due to the diffraction limit, by the wavelength of the far-infrared rays and the number of F of the lens (hereinafter referred to as F #), the size of the focus cannot become smaller than a certain size.

Therefore, in the present embodiment, the distance between the opposite surface of the window 130 and the far-infrared sensing element of the thermal imaging sensor 120 was formed to be equal to or smaller than the Rayleigh range×2, so that the size of the focus on the single far-infrared sensing element is formed to be smaller.

More specifically, based on the concept of the Rayleigh range by Gaussian Optics shown in FIG. 4, the following equations can be satisfied.

$$Z_R = \frac{\pi w_0^2}{\lambda} \quad \theta \cong \frac{\lambda_0}{\pi n w_0} \quad Z_R = \frac{\lambda}{4\theta^2 n^2}$$

($\lambda$: length of wavelength, n: medium refractive index at focus)

In addition, in order to derive $\theta$ in FIG. 4, the following calculation processes may be performed.

$$\tan\theta = \frac{D/2}{f} = \frac{D/2}{DF\#} = \frac{1}{2F\#}$$

$$\theta = \tan^{-1}\left(\frac{1}{2F\#}\right)$$

(f: lens focal length, D: lens diameter, F #: number of F of lens)

Therefore, by simplifying these equations, the following equation can be derived.

$$2Z_R = \frac{\lambda}{4\left\{\tan^{-1}\left(\frac{1}{2F\#}\right)\right\}^2 n^2}$$

That is, when the distance between the opposite surface of the window 130 and the far-infrared sensing element of the thermal imaging sensor 120 is formed to be equal to or smaller than twice the Rayleigh range ($2Z_R$), it satisfies the range where re-radiation of the focus does not occur, and thus the size of the focus on a single far-infrared sensing element can be made smaller.

For example, in the case of using a generally used F #=1 lens and the refractive index of the medium of the window 130 is 1, when the distance between the opposite surface of the window 130 and the far-infrared sensing element of the thermal imaging sensor 120 becomes greater than 11.6 um, the focus formed in the medium of the window will be radiated again, and thus it is not possible to obtain the effect of reducing the focus due to the refractive index of the medium. Therefore, the distance 11.6 um between the opposite surface of the window 130 and the far-infrared sensing element of the thermal imaging sensor 120 can be said as the boundary value for obtaining the effect of reducing the focus.

This distance may vary depending on the F # of the lens being used, and as the refractive index of medium of the window 130 increases, some far-infrared rays of the focus formed within the medium cannot go outside of the window 130 due to the internal reflection, and thus it is possible to reduce the distance between the incident surface of the window 130 and the far-infrared sensing element of the thermal imaging sensor 120 to far below 10 um (d<<$\lambda$: length of wavelength) so as to be transmitted to the sensor in the form of near-field light or evanescent light.

Hereinbelow, other embodiments of the present disclosure will be described.

FIG. 5 is a view illustrating an appearance of a far-infrared thermal imaging sensor assembly according to a second embodiment of the present disclosure.

In the case of the far-infrared thermal imaging sensor assembly according to a second embodiment of the present disclosure illustrated in FIG. 5, just as in the aforementioned first embodiment, the thermal imaging sensor 120 and a window 230 are included. Further, their basic roles are the same, and thus repetitive explanation will be omitted.

However, in the case of the present embodiment, an incident surface 234 of the window 230 is subjected to refraction reduction treatment such that the refraction of a far-infrared ray that passes through the lens 110 is reduced compared to the refraction that would have occurred in a flat plane made of a same material.

The reason for doing that is because by reducing the refraction of when the far-infrared ray enters through the incident surface 234 of the window 230, it is possible to prevent the F # of the lens from becoming greater.

In particular, the window 230 of the present embodiment is characterized in that the incident surface 234 has a convex form to have a preset curvature, and the opposite surface 232 at the opposite side is formed to be flat.

That is, by doing that, it is possible to prevent the effect of the size of the focus becoming greater due to the increased F #, and the size of the focus being made on the single far-infrared sensing element can be reduced.

Here, the curvature of the incident surface 234 may of course be applied differently depending on various factors such as the number of F of the lens, the refractive index of the medium of the window 230, and the length of the wavelength, etc.

FIG. 6 is a view illustrating an appearance of the far-infrared thermal imaging sensor assembly according to a third embodiment of the present disclosure.

The case of the far-infrared thermal imaging sensor assembly according to the third embodiment of the present disclosure shown in FIG. 6 also includes the thermal imaging sensor 120 and the window 230 just as in the other embodiments described above.

In addition, in the case of the present embodiment, by applying the characteristics of the first embodiment and the second embodiment mentioned above at the same time, it is possible to further reduce the size of the focus formed on the single far-infrared sensing element.

That is, in the present embodiment, by reducing the distance between the opposite surface 232 of the window 230 and the far-infrared sensing element of the thermal imaging sensor 120 to be equal to or smaller than twice the Rayleigh range ($2Z_R$), and at the same time by forming the incident surface 234 of the window 230 convexly to have a preset curvature, the far-infrared rays passing through the lens 110 and entering the incident surface 234 of the window 230 is able to be low-refracted.

As such, when both characteristics are applied at the same time, the size of the focus can be reduced further, thereby obtaining the effect of further reducing the size of the structure.

FIG. 7 is a view illustrating an appearance of the window 230 in a far-infrared thermal imaging sensor assembly according to a fourth embodiment of the present disclosure.

In the case of the fourth embodiment of the present disclosure illustrated in FIG. 7, as in the second embodiment and third embodiment described above, the incident surface 234 of the window 230 is formed convexly to have a preset curvature, and the opposite surface 232 at the opposite side is formed to be flat.

Further, in addition to the above, in the present embodiment, a light extraction enhancement part is further formed on the opposite surface 232.

The light extraction enhancement part is for enhancing light extraction to outside of the window 230, and this has an effect of increasing the amount of far-infrared rays being transmitted to the thermal imaging sensor due to effects such as far-infrared transmission by reflection and light transmission by the plasmon effect.

In particular, in the present embodiment, the light extraction enhancement part has a shape including a plurality of concavities and convexities 236 formed on an entirety of the opposite surface 232. That is, the present embodiment can enhance the light extraction degree due to the fine concavities and convexities 236 formed on the entirety of the opposite surface 232.

FIG. 8 is a view illustrating an appearance of the window 230 in a far-infrared thermal imaging sensor assembly according to a fifth embodiment of the present disclosure.

In the case of the fifth embodiment of the present disclosure illustrated in FIG. 8, the incident surface 234 of the window 230 is formed convexly to have a preset curvature, and the opposite surface 232 at the opposite side is formed to be flat. In addition, the light extraction enhancement part is further formed on the opposite surface 232.

In particular, in the present embodiment, the light extraction enhancement part includes a light extraction protrusion 238a formed to protrude from the opposite surface 232. The light extraction protrusion 238a also performs a role for enhancing the light extraction to the outside of the window 230.

Further, in the case of the present embodiment, the surface of the light extraction protrusion 238a is characterized to have the shape of a curved surface having a preset curvature.

Meanwhile, although not illustrated, the light extraction protrusion 238a may be formed in plural so as to correspond to each of the plurality of far-infrared sensing elements arranged in two dimensions on the substrate. That is, one light extraction protrusion 238a may be arranged one to one on each position corresponding to one far-infrared sensing element, to enhance the light extraction effect.

FIG. 9 is a view illustrating an appearance of the window 230 in a far-infrared thermal imaging sensor assembly according to a sixth embodiment of the present disclosure.

In the case of the sixth embodiment of the present disclosure illustrated in FIG. 9, the incident surface 234 of the window 230 is formed convexly to have a preset curvature, and the opposite surface 232 at the opposite side is formed to be flat. In addition, the opposite surface 232 further includes a light extraction enhancement part.

In addition, the light extraction enhancement part of the present embodiment includes a light extraction groove 239 formed to be recessed on the opposite surface 232. The light extraction groove 239 also plays a role for enhancing the light extraction to outside of the window 230, it can be known that even with such a light extraction enhancement part having a recessed shape, the light extraction effect can be enhanced.

Further, in the present embodiment, the light extraction groove 239 may be formed in plural so as to correspond to each of the plurality of far-infrared sensing elements arranged in two dimensions on the substrate. That is, one light extraction groove 239 may arranged one to one on each position corresponding to one far-infrared sensing element, thereby enhancing the light extraction effect.

FIG. 10 is a view illustrating an appearance of the window 230 in a far-infrared thermal imaging sensor assembly according to a seventh embodiment of the present disclosure.

In the case of the seventh embodiment of the present disclosure illustrated in FIG. 10, the incident surface 234 of the window 230 is formed convexly to have a preset curvature, and the opposite surface 232 at the opposite side is formed to be flat. In addition, a light extraction enhancement part is further formed on the opposite surface 232, and the light extraction enhancement part includes a light extraction protrusion 238b formed to protrude from the opposite surface 232 as in the aforementioned fifth embodiment.

However, the light extraction protrusion 238b of the present embodiment is formed such that its size area decreases as it gets farther away from the opposite surface 232, and it is different from the fifth embodiment in that a cone or a polygonal pyramid is formed at the end to form a vertex.

Further, in the present embodiment as well, the light extraction protrusion 238b is provided in plural, and the light extraction protrusion 238a may of course be arranged one to one on each position corresponding to one far-infrared sensing element, to enhance the light extraction effect.

FIG. 11 is a view illustrating an appearance of the window 230 in a far-infrared thermal imaging sensor assembly according to an eight embodiment of the present disclosure.

In the case of the eighth embodiment of the present disclosure illustrated in FIG. 11, the incident surface 234 of the window 230 is formed convexly to have a preset curvature, and the opposite surface 232 at the opposite side is formed to be flat. In addition, a light extraction enhancement part is further formed on the opposite side 232, and the light extraction enhancement part includes a light extraction protrusion 238b formed to protrude from the opposite surface 232 so as to form a vertex at the end as in the seventh embodiment.

However, in the present embodiment, it is different in that a metal thin film 237 is formed on at least a portion of the surface of the light extraction protrusion 238b. The metal thin film 237 has an effect of further increasing the amount of far-infrared rays being transmitted to the thermal imaging sensor due to effects such as far-infrared transmission by reflection and light transmission by the plasmon effect.

Hereinabove, various embodiments of the present disclosure were described, and the present disclosure is not limited to the listed embodiments.

For example, even when the incident surface 234 of the window 230 is formed as a flat surface that does not have a curvature unlike in the second to eight embodiments, it may be formed in shapes such as diffraction surface or metasurface and the like to cause low refraction of far-infrared rays. As such, refraction reduction treatment of the window 230 may be performed in various methods.

As described above, the fact that the present disclosure can be embodied in other specific forms without departing from the spirit or scope of the present disclosure in addition to the above-described embodiments is obvious to those of ordinary skill in the art. Therefore, the above-described embodiments are to be regarded as illustrative rather than restrictive, and accordingly, the present disclosure is not limited to the above description, but may be modified within the scope of the appended claims and their equivalents.

What is claimed is:

1. A window for far-infrared thermal imaging sensor assembly comprising an incident surface into which a far-infrared ray enters and an opposite surface facing towards the thermal imaging sensor, the window being bonded above the far-infrared thermal imaging sensor and formed to transmit the far-infrared ray towards the far-infrared thermal imaging sensor,
wherein the incident surface is subjected to refraction reduction treatment so as to reduce a refraction of the incident far-infrared ray, in preparation for the refraction occurring on a flat surface of a same material, and
wherein a distance between the opposite surface and the thermal imaging sensor is formed to be equal to or smaller than the Rayleigh range×2.

2. The window for far-infrared thermal imaging sensor assembly according to claim 1,
wherein the incident surface is formed convexly to have a preset curvature.

3. The window for far-infrared thermal imaging sensor assembly according to claim 1,
wherein the opposite surface is formed to be flat.

4. The window for far-infrared thermal imaging sensor assembly according to claim 1,
wherein a light extraction enhancement part is formed on the opposite surface.

5. The window for far-infrared thermal imaging sensor assembly according to claim 4,
wherein the light extraction enhancement part comprises a plurality of concavities and convexities formed on an entirety of the opposite surface.

6. The window for far-infrared thermal imaging sensor assembly according to claim 4,
wherein the light extraction enhancement part comprises a light extraction protrusion formed to protrude from the opposite surface.

7. The window for far-infrared thermal imaging sensor assembly according to claim 6,
wherein a surface of the light extraction protrusion is formed in a curved shape to have a preset curvature.

8. The window for far-infrared thermal imaging sensor assembly according to claim 6,
wherein the light extraction protrusion is formed such that its size area decreases as it gets farther away from the opposite surface, and forms a vertex at the end.

9. The window for far-infrared thermal imaging sensor assembly according to claim 6,
wherein a metal thin film is formed on at least a portion of a surface of the light extraction protrusion.

10. The window for far-infrared thermal imaging sensor assembly according to claim 4,
wherein the light extraction enhancement part comprises a light extraction groove that is formed to be recessed on the opposite surface.

11. A far-infrared thermal imaging sensor assembly comprising:
a far-infrared thermal imaging sensor that comprises a far-infrared sensing element; and
a window comprising an incident surface into which a far-infrared ray enters and an opposite surface facing towards the thermal imaging sensor, the window being bonded above the far-infrared thermal imaging sensor and formed to transmit the far-infrared ray towards the far-infrared thermal imaging sensor,
wherein the incident surface of the window is subjected to refraction reduction treatment so as to reduce a refraction of the incident far-infrared ray, in preparation for the refraction occurring on a flat surface of a same material, and
wherein a distance between the opposite surface and the thermal imaging sensor is formed to be equal to or smaller than the Rayleigh range×2.

* * * * *